United States Patent [19]

Edgar et al.

[11] Patent Number: 5,521,304
[45] Date of Patent: May 28, 1996

[54] CELLULOSE ACETOACETATE ESTERS

[75] Inventors: Kevin J. Edgar; Jonathan E. Lawniczak, both of Kingsport, Tenn.

[73] Assignee: Eastman Chemical Company, Kingsport, Tenn.

[21] Appl. No.: 395,020

[22] Filed: Feb. 27, 1995

Related U.S. Application Data

[60] Division of Ser. No. 135,107, Oct. 12, 1993, Pat. No. 5,420,267, which is a continuation-in-part of Ser. No. 109,205, Aug. 19, 1993, Pat. No. 5,242,877, which is a continuation of Ser. No. 742,821, Aug. 9, 1991, abandoned.

[51] Int. Cl.$^6$ ............... C08B 3/00; C08B 3/16; C08B 3/06; C08L 1/08
[52] U.S. Cl. ............... 536/63; 536/64; 536/69; 536/115; 536/119; 106/176; 106/186; 106/196
[58] Field of Search .................. 536/63, 64, 69, 536/115, 119, 70, 74, 75; 106/176, 186, 196

[56] References Cited

U.S. PATENT DOCUMENTS

| | | | |
|---|---|---|---|
| 2,500,029 | 3/1950 | Hagemeyer | 536/56 |
| 2,521,897 | 9/1950 | Caldwell | 536/56 |
| 3,345,313 | 10/1967 | Ruhf et al. | 536/56 |
| 4,278,790 | 7/1981 | McCormick | 536/84 |
| 4,302,252 | 11/1981 | Turbak et al. | 106/163 R |
| 4,698,391 | 10/1987 | Yacobucci et al. | 525/162 |
| 4,737,551 | 4/1988 | Dervan et al. | 525/440 |
| 4,981,959 | 1/1991 | Diamantoglou | 536/56 |
| 4,981,960 | 1/1991 | Diamantoglou | 536/56 |
| 4,997,935 | 3/1991 | Diamantoglou | 536/56 |
| 5,008,385 | 4/1991 | Diamantoglou | 536/56 |

OTHER PUBLICATIONS

Makromol. Chem., 1953, 10, 261–279.
Polymer, 1987, 28, 2317–2323.
Das Papier, 42, No. 12, pp. 690–694 (1988).
Tet. Lett., 1990, J. S. Witzeman, 31, 1401–1404.
Rev. Macromol. Chem. Phys., 1990, C30, 405–439.

Primary Examiner—Nathan M. Nutter
Attorney, Agent, or Firm—Betty J. Boshears; Harry J. Gwinnell

[57] ABSTRACT

Water soluble or water-dispersible cellulose acetoacetate esters are prepared by contacting a cellulose material with diketene, an alkyl acetoacetate, 2,2,6-trimethyl-4H-1,3-dioxin-4-one or a mixture thereof and a carboxylic anhydride in a solvent system comprising lithium chloride plus a carboxamide. Compositions containing the cellulose acetoacetate esters are useful for coatings applications.

8 Claims, No Drawings

CELLULOSE ACETOACETATE ESTERS

CROSS-REFERENCE TO RELATED APPLICATION

This is a divisional application of application Ser. No. 08/135,107 filed on Oct. 12, 1993 and now U.S. Pat. No. 5,420,267 which is a continuation-in-part of application Ser. No. 08/109,205, filed Aug. 19, 1993, and now U.S. Pat. No. 5,292,877 which is a continuation of application Ser. No. 07/74,821, filed Aug. 9, 1991 and abandoned.

FIELD OF THE INVENTION

This invention relates to cellulose acetoacetate esters, (C(AA)Es) and a method for their synthesis.

BACKGROUND OF THE INVENTION

Incorporation of acetoacetate groups into polymers is of interest due to the unique properties of the acetoacetyl group. Acetoacetylated polymers may be readily crosslinked using a variety of chemistries and may have lower solution viscosity in some cases than the parent polymers. They may have higher affinity for water due to the polarity of the acetoacetyl moiety.

Polymers with affinity for water are also increasingly valuable commercially. Solventborne coatings are rapidly being replaced by waterborne coatings and other new technologies due to the environmental concerns about organic emissions from the manufacture and application of solventborne coatings. In this regard, polymers which require a low amount of solvent to produce a solution with a workable viscosity are also desirable.

There is a need in art of waterborne coatings for novel resins which have desirable properties in many areas, such as water affinity, convenient crosslinking chemistry, good film properties, and good compatibility with other coatings resins.

Water-soluble polymers are also valuable for modifying the rheology of aqueous solutions for other applications. In the food industry, for example, they are used as thickeners; in the oilfield industry, they find use as suspension aids; and in the pharmaceutical industry, they can be used as excipients.

Polymers which may be dispersed in water, but are not soluble in water, are exceptionally valuable in the coatings industry. They enable formulation of coatings which have low application viscosity, but at the same time contain low or no amounts of volatile organic solvents.

Acetoacylated cellulose derivatives are of particular interest for coatings and other industrial applications.

Cellulose is a readily available, naturally occurring polymer. It has been shown that some cellulose esters are biodegradable. Cellulose esters are widely used in coatings, pharmaceutical, and plastics applications, and other cellulose derivatives find wide use in oilfield and food chemical applications.

While cellulose esters containing only acetoacetyl groups may be prepared by addition of diketene or tert-butyl acetoacetate to a solution of cellulose in amide/LiCl solution (where the amide is either 1-methyl-2-pyrrolidinone or N,N-dimethylacetamide), there are no general methods for preparing cellulose esters containing acetoacetyl in addition to an aliphatic or aromatic ester group or groups (cellulose acetoacetate ester, or C(AA)E).

There have been only a few references to cellulose acetoacetate esters in the literature, all dealing with cellulose acetate acetoacetates. In *Makromol. Chem*, 1953, 10, 261–279, Staudinger and Eicher reported the reaction of cellulose diacetate with diketene in acetic acid, with sodium acetate used as the catalyst. They obtained a product with a degree of substitution ("DS") per anhydroglucose unit ("AGU") of 3.0, as measured by elemental analysis.

Synthesis of CA(AA) or any other C(AA)E by reaction of diketene plus another acylating agent with cellulose itself has not been previously known.

Most of the known cellulose solvents are unsuitable for reactions in which cellulose hydroxyls serve as nucleophiles. The solvent systems recently introduced by C. L. McCormick (U.S. Pat. No. 4,278,790, 1981) and A. F. Turbak, A. El-Kafrawy, F. W. Snyder, Jr., and A. B. Auerbach (U.S. Pat. No. 4,302,252, 1981) are exceptions in that they do permit certain such reactions. McCormick and Turbak et al. have taught that cellulose may be dissolved in solutions of lithium chloride in either N,N-dimethylacetamide or 1-methyl-2-pyrrolidinone. McCormick has further taught (U.S. Pat. No. 4,278,790; *Polymer*, 1987, 28, 2317–2323) that electrophilic reagents may be added to these cellulose solutions to derivatize cellulose. McCormick has prepared cellulose acetate, methyl cellulose, cellulose carbamate, and other derivatives (but not CAA or C(AA)E) in this way.

U.S. Pat. No. 5,008,385 issued to Diamantoglou discloses the making of particular cellulose derivatives by homogeneous reaction in a mixture of dimethylacetamide and/or N-methylpyrrolidinone with LiCl, preferably after activation of the cellulose starting material in the absence of LiCl. Diketene is mentioned in a long list of components supportive of numerous combinations.

In U.S. Pat. No. 2,521,897, Caldwell describes the reaction of cellulose esters such as cellulose acetate or cellulose acetate butyrate with diketene in a solvent using an amine such as pyridine as a catalyst. The disadvantages of this include the need to esterify cellulose, hydrolyze the resulting cellulose triester, isolate and dry the product and then redissolve and react with diketene. The method also has the disadvantage of the need for use of catalysts in each step, which will be difficult to remove as a catalyst or catalyst salt from a product which has high water affinity.

In U.S. Pat. No. 2,500,029, Hagemeyer describes a process similar to that of Caldwell for the preparation of C(AA)Es. The only improvement introduced by Hagemeyer is that the cellulose ester may be reacted with diketene in a solvent without a catalyst; the reaction is driven thermally. A catalyst is used in the initial esterification of cellulose. The process has all of the other disadvantages of the Caldwell process as described above.

In *Das Papier*, 42, No. 12, pp. 690–694 (1988), Diamantoglou, et al., teaches esterification of cellulose in solution in DMAC/LiCl or NMP/LiCl with carboxylic anhydrides. He teaches the use of strong acids, amines, and metal acetates as catalysts. In two of the examples shown, no catalyst was used. In these two examples, he observed poor efficiency with respect to the carboxylic anhydride (25–40%) and low product DS/AGU (0.25–1.20). There were no attempts at acetoacetylation nor were any C(AA)Es described.

Clearly, a need exists for a process by which C(AA)Es of the desired degrees of substitution can be prepared directly from solution in order to assure homogeneous substitution along the polymer chains and optimum product solubility. The process must be economical and amenable to scaleup to industrial production. It is desirable to accomplish cellulose acylation without the need for catalysts, so the solvent and lithium chloride could be easily recycled, without interference from salt or catalyst residues. It would also be desirable to obtain materials from this process which would be soluble in water, and other materials, the organic solutions of which would be dispersible in water.

SUMMARY OF THE INVENTION

This invention relates to a process for making cellulose acetoacetate esters having a total DS/AGU of 0.1 to about 3.0, preferably about 0.1 to about 2.9. More preferably, the novel, water-dispersible and/or water-soluble cellulose acetoacetate esters have a DS/AGU of about 0.1 to about 1.0, and even more preferably, about 0.4 to about 0.8.

More particularly the process of the present invention comprises: a process for preparing a cellulose acetoacetate ester, the process consisting of contacting in any order the following:

(i) a cellulose material, (ii) a solubilizing amount of a solvent system comprising lithium chloride plus a carboxamide selected from the group consisting of 1-methyl-2-pyrrolidinone, N,N-dimethylacetamide, or a mixture thereof, (iii) diketene, an alkyl acetoacetate, 2,2,6-trimethyl-4H-1,3-dioxin-4-one, an acetoacetate ester or a mixture thereof, and (iv) an acylating reagent selected from the group consisting of:
  (a) an acid chloride combined with an acid acceptor and
  (b) a carboxylic anhydride, wherein said components (i) and (ii) are reacted first and components (iii) and (iv) are contacted in any order with the product of the contacting of components (i) and (ii), under conditions to promote formation of the desired cellulose acetoacetate ester having a DS/AGU of 0.1 to about 3.0.

The present invention is also directed to a water-soluble cellulose acetoacetate ester, preferably having a DS/AGU of 0.1 to 1.0, more preferably, 0.4 to 0.8.

The present invention is further directed to four types of coating compositions comprising the cellulose acetoacetate ester of the invention.

DETAILED DESCRIPTION OF THE INVENTION

The unique ability of certain of the acetoacetylated cellulose esters of the invention to be completely solubilized by water makes them useful in low VOC (volatile organic content) coatings, as well as in other thickener applications. Low VOC is becoming increasingly desirable because of environmental and regulatory considerations.

By the term "water soluble" and derivative terms thereof, it is meant that upon contacting the cellulose acetoacetate ester with an excess of water (a solubilizing amount) at 25° C., and optionally mixing, the cellulose acetoacetate becomes solubilized or dissolved, without the need for additional cosolvents or dispersing aids, at a level of at least 10 wt. percent, preferably at least 20 wt. percent.

Mixed cellulose acetoacetate esters have been found to be useful in coatings applications because of the low solution viscosity of such esters, the dispersibility in water of C(AA)E solutions, and the cross-linking chemistry provided by the acetoacetate functionality.

By the term "water-dispersible" and derivative terms thereof, it is meant that after dissolving the cellulose acetoacetate in organic solvent, the resultant solution can form a dispersion when agitated in the presence of water (in excess).

The ability to disperse certain of these C(AA)Es in aqueous dispersion is extremely valuable to the coatings industry, since it permits low application viscosity combined with low VOC.

The practice of the current invention allows for a wide variety of cellulose starting materials, temperatures, concentrations, nonsolvents, and reactant ratios. A wide variety of C(AA)E's may be produced, depending on the conditions selected.

The cellulose acetoacetate esters of the invention have the desired DS/AGU and comprise repeating units of the structure:

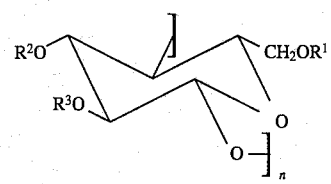

wherein $R^1$, $R^2$, and $R^3$, are selected separately from the group consisting of: hydrogen, acetoacetyl, and $R_4C=O$, wherein $R_4$ is selected from the group consisting of alkyl having from about 1 to about 20 carbon atoms, phenyl, naphthyl, and alkenyl having from about 1 to about 20 carbon atoms, and further wherein at least one of $R^1$, $R^2$ and $R^3$ is $R_4C=O$ and at least one of $R^1$, $R^2$ and $R^3$ is acetoacetyl.

Examples of alkyl groups having from about 1 to about 20 carbon atoms are methyl, ethyl, propyl, pentyl, nonanyl, dodecanyl, 2-propyl, 2-methyl-2-propyl, 2-butyl, succinyl, phthalyl, and maleyl. More preferred alkyl groups are methyl, ethyl, propyl, pentyl, 2-propyl, 2-methyl-2-propyl, succinyl, phthalyl and maleyl.

Examples of phenyl groups are phenyl, 4-methylphenyl, 4-chlorophenyl.

Examples of naphthyl groups are 1-naphthyl, 2-naphthyl.

Examples of alkenyl groups having from about 1 to about 20 carbon atoms are ethenyl, 2-methylethenyl, 2-phenylethenyl and 1-methylethenyl.

The C(AA)E's of the invention typically have an intrinsic viscosity (IV) as measured in dimethyl-sulfoxide (DMSO) at a concentration of 0.25 g polymer/100 ml solvent at 25° C. of about 0.05 to about 3.5, preferably about 0.2 to about 1.0. The weight average molecular weight ($M_w$) as measured by gel permeation chromatography in 1-methyl-2-pyrrolidinone using polystyrene standards is typically about 20,000 to about 1,000,000.

The cellulose acetoacetate esters of the process invention have total DS/AGUs of 0.1 to 3.0, preferably, 0.1 to 2.9. The water-soluble acetoacetate esters of the invention have total DS/AGUs of 0.1 to 1.0, more preferably 0.4 to 0.8.

For the purposes of this invention, total DS/AGU is defined as the sum of the degree of substitution of acetoacetyl and the degree of substitution of other ester groups(s).

A wide variety of sources of cellulose may be used for the practice of the invention. It should be particularly noted that the crystal structure of the cellulose starting material is irrelevant, since it will be destroyed when the cellulose is dissolved. This permits use of low molecular weight microcrystalline cellulose. Cellulose sources useful in our invention include hardwoods, softwoods, cotton linters, regenerated cellulose, bacterial and microcrystalline cellulose.

The solvent system useful herein and as taught by McCormick and Turbak must include lithium chloride plus a carboxamide. The carboxamide may be 1-methyl-2-pyrrolidinone, N,N-dimethylacetamide, or a mixture thereof. The ratios of salt or solvent to cellulose can vary within a moderately wide range.

The acetoacetylating reagent may be either diketene, 2,2,6-trimethyl-4H-1,3-dioxin-4-one, or an acetoacetate ester wherein the alkyl group is straight chain or branched and has 1 to 18 carbon atoms. As taught by J. S. Witzeman (*Tet. Lett.*, 1990, 31, 1401–1404), tert-butyl acetoacetate is an especially suitable alkyl acetoacetate or acetoacetate ester because it generates the reactive intermediate, acetylketene, at a high rate.

The other acylating reagent may be carboxylic anhydride. When a carboxylic anhydride is used, it is unexpected that no added catalyst is required in the process of this invention. Other activated acyl derivatives, such as acid chlorides, may be used as well. Preferred acid chlorides are acetyl chloride, propionyl chloride, butyryl chloride, hexanoyl chloride, lauroyl chloride, and stearoyl chloride. However, in the case of acid chlorides, an acid acceptor such as pyridine, sodium bicarbonate, or sodium acetate must be used in combination with the acylating reagent.

Catalysts are not necessary if the process of the current invention is carried out in the temperature range of 80°–160° C. as described below. Catalysts may be used to permit use of lower temperatures in the process. Such catalysts include (but are not limited to) amines (including pyridine, alkylpyridines, triethylamine, and 4-dimethylaminopyridine), mineral acids (including sulfuric acid and hydrochloric acid) and alkali or alkaline earth metal salts (including sodium acetate, lithium chloride). In the case of the use of carboxylic anhydrides, no catalyst is necessary.

In the synthesis process of the invention, the molar ratio of component (iii):component (iv) is that amount that will result in the desired DS/AGU under the chosen reaction conditions. The amount of component (i) is typically about 0.1 percent to about 8 percent, preferably about 3 percent to about 5 percent, based on the weight of the carboxamide. The amount of lithium chloride is typically about 100 percent to about 300 percent, preferably about 150 percent to about 250 percent, based on the weight of component (i).

Conditions suitable for the formation of C(AA)Es can vary widely. The temperature of addition of the acylating reagent (carboxylic anhydride, for example) can be from 0°–200° C., with 25°–120° C. most preferred. The acylating reagent addition time can vary over a wide range, depending on the reaction temperature and the capability for heat removal. The temperature of addition of the acetoacetylating reagent can vary between 0°–200° C. When diketene is used, reaction will occur at a useful rate throughout this temperature range; 80°–120° C. is preferred because reaction is instantaneous in that range. When tBAA or TKD is used, reaction will be very slow below about 60° C. The range 90°–120° C. is preferred for tBAA or TKD, because reaction is fast in that temperature range.

The yield of C(AA)E in the process of the invention is at least about 80 percent, preferably at least about 98 percent, said percentages being based on the theoretical maximum yield of C(AA)E.

Nonsolvents to be used in the isolation of the C(AA)E can be any solvent in which the reaction solvents and byproducts are miscible, but in which the C(AA)E is insoluble. Preferred nonsolvents include acetone, methanol, ethanol, 2-propanol, and water or mixtures thereof. An insolubilizing amount of nonsolvent is generally at least about 900 percent, based on weight of nonsolvent per weight cellulose used. After insolubilizing the C(AA)E with nonsolvent, it is typically desired to perform the additional optional step of separating the C(AA)E from the nonsolvent, e.g., by filtration, drying, decantation, washing, and the like, to result in substantially pure C(AA)E.

The diketene and carboxylic anhydride should be contacted with the product of contacting the cellulose with the solvent system of McCormick or Turbak.

The order of addition of the carboxylic anhyride and diketene (or other acylating and acetoacetylating agents) can be varied. Either reagent can be added first, or they can be added simultaneously or as a premixture. One would expect that changing the order of addition would change the position of substitution. This could be derived from Table I as indicated by the marked variation in the Tg of the products that have been made using various orders of addition.

The class of C(AA)E's prepared as taught herein have the desirable properties of ability to form organic solutions of low viscosity, ability to disperse their solutions in organic solvents in water, and the rich crosslinking chemistry provided by the acetoacetate functionality. Some of the C(AA)E's have the desirable property of being dissolved or dispersed in water without the need of added organic cosolvents or other dispersing aids. These properties provide materials which can be formulated into crosslinkable coatings. Fully formulated, pigmented and catalyzed, water-borne C(AA)E enamels are prepared by first adjusting the viscosity of a C(AA)E/water solution or a C(AA)E/solvent solution or a C(AA)E/solvent/water dispersion to a Gardner-Holdt viscosity of Z1–Z3 (1000 to 3000 cP) then mechanically dispersing a pigment, such as rutile titanium dioxide, until the desired fineness-of-dispersion is obtained.

The coating compositions of this invention include compositions (1)–(4) as hereinafter described.

(1) A coating composition comprising:
  (A) about 20 to about 80 percent, based on the weight of the total coating composition, of one or more of the cellulose acetoacetate esters of the invention, and
  (B) about 20 to about 80 percent, based on the weight of the total coating composition, of a coating solvent. Preferred coating solvents include glycol ethers, ketones, esters, and the like.

Examples of glycol ethers are ethylene glycol propyl ether, ethylene glycol butyl ether, and propylene glycol methyl ether. Examples of useful ketones are acetone, methyl amyl ketone, and n-heptanone. Examples of useful ester solvents are ethyl acetate and n-butyl acetate.

It is preferred that the composition of (1) contain component (A) at 30 to 50 percent and component (B) at 50 to 70 percent, based on the weight of the total coating composition.

(2) A coating composition comprising:
  (A) about 25 to 75 percent, based on the weight of the total coating composition, of acetoacetates ester product of coating composition (1), and
  (B) about 25 to about 75 percent, based on the total coating composition, of water.

It is preferred that the composition of (2) contain component (A) at 40 to 60 percent and component (B) at 60 to 40 percent, based on the weight of the total coating composition.

(3) A coating composition comprising:
  (A) about 80 to about 95 percent, based on the weight of the total coating composition of the cellulose acetoacetate ester product of coating composition (2), (B) about 1 to about 15 percent, based on the weight of the total coating composition, of a crosslinking agent, and (C) 0 to about 19 percent, based on the weight of the total coating composition, of water.

Preferred crosslinking agents for coating composition (3) are substituted melamine and urea resins.

It is preferred that the composition of (3) contain component (A) at 85 to 90 percent, component (B) at 4 to 10 percent, and component (C) at 0 to 10 percent.

(4) A coating composition comprising:
(A) about 85 to about 99 percent, based on the weight of the total coating composition, of the cellulose acetoacetate ester product of coating composition (1), (B) about 1 to about 15 percent, based on the weight of the total coating composition, of a crosslinking agent, and (C) about 0 to about 2 percent, based on the weight of the total coating composition, of a catalyst.

For coating composition (4), it is preferred that component (A) is present at 87 to 95 percent, component (B) is present at 2 to 12 percent, and component (C) is present at 1 to 10 percent.

Isocyanate-containing resins and trimethylolpropane triacrylate are the preferred crosslinking agents for composition (4). These isocyanate-containing resins include resins based on hexamethoxy-diisocyanate (HMDI) and toluene diisocyanate (TDI).

When trimethylolpropane triacrylate is used, it is preferred that the catalyst is 1,8-diazabicyclo[5.4.0]-undec-7-ene.

When a polyisocyanate resin is used, it is preferred that the catalyst is dibutyltindilaurate.

Crosslinking resins, catalysts, rheological additives, antisettling agents, tinting pigments, flexibilizing plasticizers and the like can be added to the dispersion as needed during a final letdown to application viscosity. Of course, final viscosity requirements will vary with application and will be about 100 cP for air-atomized spraying to about 1000 cP for roller coating operations. Other procedures such as masterbatch preparation and the use of pre-dispersed pigments would also be acceptable.

The coatings test procedures used in the description and examples of this invention are as follows:

1. Testing Coated Metal Specimens at 100 Percent Relative Humidity—Cleveland humidity (ASTM Method D 2247)
2. Gardner-Holdt Bubble Viscosity (ASTM Method D 1545)
3. Film Thickness (General Electric Gage, Type B)
4. Film Hardness (Pencil Method, ASTM Method D3363 or Tukon Method, ASTM Method D1474)
5. Solvent resistance (methylethyl ketone (MEK) dynamic rub test) (see ASTM Method D 1308)
6. Staining Tests (ASTM Method D 1540)
7. Specular Gloss (ASTM Method D 523)
8. Hegmann Fineness-of-Dispersion (ASTM Method D 1210)

As discussed herein, one class of preferred crosslinking agents contain substituted melamine and urea resins or residues such as hexamethoxymethylmelamine, hexabutoxymethylmelamine, methoxymethylmethylolmelamine, tetramethoxymethylurea, or tetrapropoxymethylurea. Other useful crosslinking materials are amine terminated polyamides, polyoxyethylenes, polyoxypropylenes and the like. Other useful crosslinking agents are polyisocyanate resins such as HMDI, MDI, and the like. Still another useful crosslinking agent is trimethylolpropane triacrylate (reaction catalyzed by 1,8-diazabicyclo[5.4.0]-undec-7ene). Particularly useful crosslinking materials include an amino resin offered by American Cyanamid, CYMEL 373, and a polyamine available from Texaco, JEFFAMINE D400, and a polyisocyanate resin available from Miles, Inc., DESMODUR N-75 (reaction catalyzed by 0.02% dibutyltindilaurate).

The coating composition of the mixture preferably contains at least 0.1 percent crosslinking agent, preferably about 1 percent to about 35 percent crosslinking agent, and more preferably about 2 to about 25 percent, said percentages being based on the weight of the C(AA)E.

The coating composition optionally contains up to about 70 weight percent based on the weight of coating binder of one or more additional coating additives.

A preferred amount of coating additives is about 1 to about 30 percent. Examples of such coating additives include flow control additives such as silicones, fluorocarbons, or cellulosics; coalescing solvents such as diethylene glycol monobutyl ether, trimethylpentaneanediol monoisobutyrate, or ethylene glycol monooctyl ether; strong acid catalysts such as p-toluenesulfonic acid, trichloroacetic acid, or trifluoromethanesulfonic acid; pigments such as titanium dioxide, barytes, clay, or calcium carbonate; colorants such as phthalocyanine blue, molybdate orange, or carbon black; biocides such as tin compounds (e.g., tributyltin oxide), quaternary ammonium compounds, or iodine compounds; thickeners such as carboxymethyl cellulose, hydroxypropyl methyl cellulose, ethyl hydroxyethyl cellulose, guar gum and the like.

The Gardner-Holdt viscosity of the coating composition is preferably about T to about Z3; more preferably about W to about Z1. These viscosity values permit application by spraying and/or wire-rod drawdowns (which simulate a roller coating operation) as practiced in Examples 6–9 hereof.

The coating composition can be prepared by the techniques described herein and/or by techniques known in the art, e.g., as disclosed in U.S. Pat. Nos. 4,698,391, 4,737,551, and 3,345,313, the disclosures of which are incorporated herein by reference in their entirety.

The coating composition can be applied onto a substrate and crosslinked using techniques known in the art; e.g., by spray-applying 3 to 4 mils of wet coating and baking in a 150° C. forced air oven for 30 minutes, by similarly preparing and baking at a lower temperature of 60° C. for one hour, or in some cases by curing at ambient temperature for 2 to 24 hours.

The substrate can be any common substrate such as paper, polymer films such as polyethylene or polypropylene, metals such as aluminum, steel, galvanized steel, glass, urethane elastomers, primed (painted) substrates, and the like.

After the coating composition is coated onto a substrate and cured (i.e., crosslinked) such a cured coating has many desirable properties such as good pencil hardness, good gloss, and good MEK double rub solvent resistance, and water rub resistance.

Preferred pencil hardness (mar/cut) is about B to about 4H; more preferred is at least F; preferred gloss at 60° is about 40 percent to about 100 percent, more preferred is above 60 percent; preferred solvent rub resistance is at least about 200, for cured coatings and about 25 for thermoplastic coatings. Preferred water rub resistance is about 100.

As appreciated in the art, the exact components and properties of components desired for any given coating application can vary, and therefore, routine experimentation may be required to determine the optional components and proportions of components for a given application and desired properties.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise noted. All percentages are by weight unless otherwise indicated.

EXAMPLES

In the following examples, the cellulose (8 g) and DMAC solvent (300 mL) were added to a 500 mL three-neck round bottom flask equipped with mechanical stirrer, thermometer, nitrogen inlet, and distillation head. The slurry was heated to 100°–140° C. under nitrogen, with stirring. Lithium chloride (15 g) was added all at once, then the slurry was heated to distill off some portion (typically 75–85 mL) of the solvent; this was used as an economical and practical method for removing water from the reaction mixture. This is particularly important since water will react unprofitably with the carboxylic anhydrides and diketene, and since the cellulose, carboxamide solvent, and lithium chloride all are quite hygroscopic. The slurry was cooled to a temperature between 10°–150° C., and stirred until the cellulose dissolved. Typically this took 1–3 hours. The solution was heated to the reaction temperature (110° C. in each of these examples), then the appropriate carboxylic anhydride was added over the specific time (Addition Time A). The solution was stirred at the reaction temperature for a specified hold time (Hold Time A). The specified amount of diketene then was added over a specified time (Addition Time D). The solution was stirred at the reaction temperature for a specified hold time (Hold Time D). The solution then was cooled to 20°–40° C. The product was isolated by adding the reaction mixture dropwise to the specified nonsolvent with strong agitation. The product was washed with the specified amount of the specified nonsolvent(s), the specified number of times. The product was dried in a vacuum oven under nitrogen at 40°–60° C. The yields quoted in the examples are of isolated, well-characterized products. DS/AGU (degree of substitution per anhydroglucose unit) was determined by $^1$H NMR in d-6 DMSO (dimethylsulfoxide) containing several drops of trifluoroacetic acid (to shift any hydroxyl protons downfield). Gel permeation chromatography used NMP (1-methyl-2-pyrrolidinone) as solvent (polystyrene reference). Intrinsic viscosity was measured in DMSO (dimethylsulfoxide) solution. Differential scanning calorimetry (20° C./min, second scan, after heating to 225° C. at 20° C./min, and cooling to below 0° C.) was employed to determine Tg's. Representative members of each family of materials were examined by infrared spectroscopy to confirm product identity. All temperatures in degrees centigrade.

The low solution viscosities of C(AA)Es are illustrated in Table II.

Table III lists some performance properties of films made from aqueous dispersions of C(AA)Es, both uncrosslinked and crosslinked with melamine crosslinker.

Table IV lists some performance properties of films made from solutions of C(AA)Es and from solutions crosslinked with amine (enamine formation), with trimethylolpropane triacrylate (Michael reaction), and with isocyanate-containing resin.

The data in Tables II–IV illustrate the usefulness of C(AA)Es in providing high solids solutions which can be dispersed in water and provide coatings films with varied crosslinking possibilities.

Example 1

Reagents set forth below were subjected to the standard procedure described above under the standard reaction conditions, except as described below. The results, in terms of identity and yield of the desired cellulose acetoacetate ester, and key analyses of the product, are also set forth below.

| | |
|---|---|
| Cellulose | Natchez HVX (hardwood cellulose pulp, available from International Paper in Natchez, Mississippi) |
| Carboxylic Anhydride | Acetic anhydride |
| Equiv | 0.3 |
| Addition Time A | 3 min |
| Hold Time A | 20 min |
| Equiv Diketene | 1.5 |
| Addition Time D | 25 min |
| Hold Time D | 33 min |
| Nonsolvent | Methanol |
| Washing | 2 × 1L methanol, then Soxhlet extraction with methanol |
| CA(AA) Yield | 95% of theory |
| Key Analyses | DS(acetyl) = 0.12, DS (acetoacetyl) = 1.29, IV = 2.10, GPC $M_n$ = 66,000, Tg = 163, soluble in DMSO and NMP. |

This example demonstrates synthesis of a cellulose acetate acetoacetate by this process directly from cellulose.

Example 2

Reagents set forth below were subjected to the standard procedure described above under the standard reaction conditions, except as described below. The results, in terms of identity and yield of the desired cellulose acetoacetate ester, and key analyses of the product, are also set forth below.

| | |
|---|---|
| Cellulose | Microcrystalline cellulose |
| Carboxylic Anhydride | Propionic anhydride |
| Equiv | 0.4 |
| Addition Time A | 5 min |
| Hold Time A | 16 min |
| Equiv Diketene | 0.2 |
| Addition Time D | 2 min |
| Hold Time D | 30 min |
| Nonsolvent | Methanol |
| Washing | 2 × 1L methanol, then Soxhlet extraction with methanol |
| C(AA)P Yield | 87% of theory |
| Key Analyses | DS(propionyl) = 0.28, DS (acetoacetyl) = 0.20, IV = 1.13, GPC Mn = 47,000, Tg = 213, soluble in water, DMSO and NMP. |

This example demonstrates synthesis of a water-soluble cellulose acetoacetate propionate by this process, and also demonstrates that even the highly crystalline microcrystalline cellulose is a suitable starting material for this process.

Example 3

Reagents set forth below were subjected to the standard procedure described above under the standard reaction conditions, except as described below. The results, in terms of identity and yield of the desired cellulose acetoacetate ester, and key analyses of the product, are also set forth below.

| | |
|---|---|
| Cellulose | Microcrystalline cellulose |
| Carboxylic Anhydride | Butyric anhydride |
| Equiv | 0.3 |
| Addition Time A | 10 min |
| Hold Time A | 21 min |
| Equiv Diketene | 0.3 |
| Addition Time D | 3 min |
| Hold Time D | 32 min |
| Nonsolvent | Methanol |
| Washing | 2 × 1L methanol, then Soxhlet extraction with methanol |
| C(AA)B Yield | 88% of theory |
| Key Analyses | DS(butyryl) = 0.20, DS (acetoacetyl) = 0.24, IV = 1.09, GPC Mn = 31,000, Tg > 225, soluble in water, DMSO and NMP. |

This example demonstrates synthesis of a water-soluble cellulose acetoacetate butyrate by this process. C(AA)B is cellulose acetoacetate butyrate.

Example 4

Reagents set forth below were subjected to the standard procedure described above under the standard reaction conditions, except as described below. The results, in terms of identity and yield of the desired cellulose acetoacetate ester, and key analyses of the product, are also set forth below.

| | |
|---|---|
| Cellulose | Microcrystalline cellulose |
| Carboxylic Anhydride | Butyric anhydride |
| Equiv | 1.5 |
| Addition Time A | 17 min |
| Hold Time A | 23 min |
| Equiv Diketene | 1.5 |
| Addition Time D | 17 min |
| Hold Time D | 30 min |
| Nonsolvent | Methanol |
| Washing | 1 × 1L water, then 1 × 1L methanol, then reprecipitation of the solid product from acetone solution into water (washed with 2 × 1L water) |
| C(AA)B Yield | 79% of theory |
| Key Analyses | DS(butyryl) = 1.33, DS (acetoacetyl) = 1.37, IV = 1.11, GPC Mn = 47,000, Tg = 136, soluble in DMSO, 2-butanone, acetic acid, acetone, tetrahydrofuran, chloroform, dichloromethane and NMP. |

This demonstrates the ability of the process to prepare a high-DS C(AA)E which is soluble in a broad range of organic solvents, with good utilization of the diketene and carboxylic anhydride. C(AA)B is cellulose acetoacetate butyrate.

Example 5

Reagents set forth below were subjected to the standard procedure described above under the standard reaction conditions, except as described below. The results, in terms of identity and yield of the desired cellulose acetoacetate ester, and key analyses of the product, are also set forth below.

| | |
|---|---|
| Cellulose | Microcrystalline cellulose |
| Carboxylic Anhydride | Acetic anhydride |
| Equiv | 1.5 |
| Addition Time A | 32 min |
| Hold Time A | 30 min |
| Equiv Diketene | 0.3 |
| Addition Time D | 12 min |
| Hold Time D | 37 min |
| Nonsolvent | Methanol |
| Washing | 2 × 1L methanol then Soxhlet extraction with methanol |
| CA(AA) Yield | 76% of theory |
| Key Analyses | DS(acetyl) = 1.37, DS (acetoacetyl) = 0.41, IV = 1.08, GPC Mn = 43,000, Tg = 204, soluble in DMSO and NMP. |

This example differs from the general procedure in that the diketene was added first, then the carboxylic anhydride. This example demonstrates that reversal of the order of addition of diketene and carboxylic anhydride also affords a homogeneously substituted, soluble C(AA)E. Table I compares the results from this experiment, and two essentially identical experiments in which the only variable is the order of addition. In one experiment (B) the order of addition was reversed from that of Example 5 (A); in another experiment, the diketene and acetic anhydride were premixed and added together. It is evident that most analytical properties measured are similar, but that the Tg varies significantly with method of addition. This provides another inexpensive tool for control of product properties.

TABLE I

Cellulose Acetate Acetoacetate
Experiment on Properties and Substitution vs. Mode of Addition

| Experiment | Ac$_2$O EQUIV. | DIK. EQUIV. | Order of Addition | DS Ac | DS AA | DS (TOT) | IV | GPC Mn | Tg (°C.) | Solubility DMSO | NMP |
|---|---|---|---|---|---|---|---|---|---|---|---|
| A | 1.50 | 0.30 | DIK, Ac$_2$O | 1.37 | 0.41 | 1.78 | 1.08 | 42.9 | 204 | S | S |
| B | 1.50 | 0.30 | Ac$_2$O, DIK | 1.28 | 0.36 | 1.64 | 0.95 | 41.4 | 190 | S | S |
| C | 1.50 | 0.30 | Mixed | 1.37 | 0.43 | 1.80 | 1.01 | 40.1 | 194 | S | S |

DIK. = Diketene
S = Soluble
Ac = Acetyl
AA = Acetoacetate
Ac$_2$O = Acetic anhydride TABLE I-continued Cellulose Acetate Acetoacetate
Experiment on Properties and Substitution vs. Mode of Addition

| Experiment | Ac₂O EQUIV. | DIK. EQUIV. | Order of Addition | DS Ac | DS AA | DS (TOT) | IV | GPC Mn | Tg (°C.) | Solubility DMSO | NMP |
|---|---|---|---|---|---|---|---|---|---|---|---|

Mixed = Diketene and Ac₂O were mixed prior to addition
All GPC Mn values have been divided by 1000
All runs used microcrystalline cellulose

TABLE II

C(AA)E Solution Viscosities

| Sample | DS Bu | DS AcAc | DS OH | Solution (1) Viscosity 38% solids, cP |
|---|---|---|---|---|
| 175 | 1.97 | 0.50 | 0.53 | 36,000 |
| 178 | 1.90 | 0.53 | 0.57 | 4,600 |
| 181 | 1.73 | 0.87 | 0.40 | 17,500 |
| 184 | 1.89 | 0.47 | 0.64 | 30,000 |
| 187 | 1.95 | 0.64 | 0.41 | 15,000 |
| CAB | 1.73 | 0 | 0.45 | >700,000 |
| CAB | 2.12 | 0 | 0.75 | 665,000 |

DS (Bu and AcAc of C(AA)Es determined by proton NMR.
DS (OH) determined by difference.
CAB - Cellulose Acetate Butyrate
(1) Solution Formula (all weight percents):
C(AA)E 38%
Butylbenzyl Phthalate 2%
Ethylene glycol propyl ether 15%
Ethylene glycol butyl ether 15%
Ethyl 3-ethoxy propionate 30%

TABLE III

C(AA)E Dispersion Film Properties

| Sample | DS Bu | DS AcAc | DS OH | Dispersion (1) Tukon(3) | Dispersion (1) MEK Rubs | Dispersion (1) Water Rubs | Dispersion, Crosslinked (2) Tukon | Dispersion, Crosslinked (2) MEK Rubs | Dispersion, Crosslinked (2) Water Rubs |
|---|---|---|---|---|---|---|---|---|---|
| 106 | 2.37 | 0.45 | 0.18 | | | | 6.1 | 19 | 300 |
| 110 | 2.53 | 0.26 | 0.21 | | | | 5.7 | 20 | 60 |
| 178 | 1.90 | 0.53 | 0.53 | 15.8 | 2 | 1000 | | 50 | 750 |
| 178F | 1.84 | 0.61 | 0.55 | 6.1 | 10 | 325 | 16.9 | 880 | 1000 |
| 196-33 | 1.76 | 0.62 | 0.62 | 19.0 | 20 | 1000 | 18.2 | 1000 | 760 |
| 196-22 | 1.83 | 0.66 | 0.51 | 17.8 | 40 | 425 | 20.0 | 1000 | 400 |
| CAB | 1.72 | 0.00 | 0.45 | | 9000 | | 2.8 | 15 | 58 |

(1) Dispersion Formula
Table II Solution 50 parts
Water 50 parts
Mix with high shear dispersion.
Add surfactant if needed.
(2) Crosslinked Dispersion Formula
Dispersion Formula 100 parts
American Cyanamid Cymel 373 - (Methoxy methyl methylol melamine resin) 5 parts
Water 5 parts
Baked 30 min @ 250° F.
(3) Tukon method - Tukon hardness - ASTM Method D1474
Knoops hardness number - ASTM Method D3363
(4) MEK rubs - ASTM Method D1308 - methylethyl ketone (MEK) dynamic rub test
(5) Water Rubs - ASTM Method D1308
(6) CAB - Cellulose Acetate Butyrate

TABLE IV

| | | | | Solution (1) | | Enamine Formation (2) | | | Michael Reaction (3) | | | Isocyanate (4) | |
|---|---|---|---|---|---|---|---|---|---|---|---|---|---|
| | DS | | | | | | | | | | | | |
| Sample | Bu | AcAc | OH | Tukon(5) | Water Rubs | Tukon | MEK Rubs | Water Rubs | Tukon | MEK Rubs | Water Rubs | Tukon | MEK Rubs |
| 101 | 2.37 | 0.45 | 0.18 | 18.7 | 50 | 2.9 | 25 | 1000 | 10.5 | 10 | 135 | 16.2 | 127 |
| 110 | 2.53 | 0.26 | 0.21 | 10.3 | 38 | | | | | | | 13.0 | 162 |
| 118 | 2.97 | 0.02 | 0.01 | 6.8 | 25 | 10.0 | 25 | 275 | 10.6 | 10 | 970 | 13.5 | 8 |
| 131 | 2.68 | 0.20 | 0.12 | 11.2 | 19 | | | | | | | | |
| CAB | 2.12 | 0.00 | 0.75 | 19.0 | | 5.2 | 10 | 1000 | 11.6 | 40 | 285 | 16.4 | 104 |
| CAB | 1.72 | 0.00 | 0.45 | 18.0 | 20 | | | | | | | 16.0 | 200 |

(1) Solution Formula
Cellulose Ester 30%
n-Butyl Acetate 30%
2-Heptanone 30%
Ektapro EEP 10%
(2) Enamine Formation
Solution Formula 100 parts
Jeffamine D400 2 parts
Bake 30 min at 250° F.
(3) Michael Reaction
Solution Formula 100 parts
TMPTA 2 parts
5% DBU 0.8 parts
Bake 30 min at 250° F.
(4) Isocyanate Reaction
Solution Formula 100 parts
Miles Desmodur N-75 11 parts
10% Dibutyltin dilaurate 0.25 parts
Air dry 24 hours. Age 48 hours at 120° F.
(5) Tukon = Tukon hardness, Knoops hardness number
TMPTA = Trimethylolpropane triacrylate
DBU = 1,8-diazabicyclo[5.4.0]undec-7-ene
CAB = Cellulose Acetate Butyrate
EEP = Ethyl-3-ethoxy propionate
Jeffamine D400 = a polyamine commercially available from Texaco, Inc.
Tukon method = Tukon hardness - ASTM Method D1474
Knoops hardness number - ASTM Method D3363
MEK rubs = ASTM Method D1308 - methylethyl ketone (MEK) dynamic rub test
Water Rubs = ASTM Method D1308

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. A water-soluble cellulose acetoacetate ester, comprising repeat units of the structure:

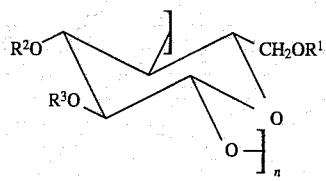

wherein $R^1$, $R^2$ and $R^3$ are selected independently from the group consisting of hydrogen, acetoacetyl, $R_4C=O$ wherein $R_4$ is further selected from the group consisting of alkyl having from about 1 to about 20 carbon atoms, phenyl, naphthyl, and alkenyl having from about 1 to about 20 carbon atoms and further wherein at least one of $R^1$, $R^2$ and $R^3$ is $R_4C=O$, and at least one of $R^1$, $R^2$ and $R^3$ is acetoacetyl.

2. The cellulose acetoacetate ester of claim 1 further having a total DS/AGU of 0.1 to 1.0.

3. The cellulose acetoacetate ester of claim 1 further having a total DS/AGU of 0.4 to 0.8.

4. The cellulose acetoacetate ester of claim 1 wherein said alkyl is selected from the group consisting of methyl, ethyl, propyl, pentyl, nonanyl, dodecanyl, 2-propyl 2-methyl-2-propyl, 2-butyl, succinyl, phthalyl, and maleyl.

5. The cellulose acetoacetate ester of claim 1 wherein said phenyl is selected from the group consisting of phenyl, 4-methylphenyl and 4-chlorophenyl.

6. The cellulose acetoacetate ester of claim 1 wherein said naphthyl is selected from the group consisting of 1-naphthyl and 2-naphthyl.

7. The cellulose acetoacetate ester of claim 1 wherein said alkenyl is selected from the group consisting of ethenyl, 2-methylethenyl, 2-phenylethenyl and 1-methylethenyl.

8. The cellulose acetate ester of claim 1 wherein the total DS/AGU is from about 0.4 to about 1.1.

* * * * *